United States Patent [19]

Hagiwara et al.

[11] Patent Number: 5,133,912
[45] Date of Patent: Jul. 28, 1992

[54] METHOD OF MANUFACTURING FOAM-MOLDED PRODUCTS

[75] Inventors: Noboru Hagiwara, Komaki; Michiaki Izawa, Kakamigahara; Masao Minami, Komaki, all of Japan

[73] Assignee: Mitsuboshi Belting Ltd., Japan

[21] Appl. No.: 530,636

[22] Filed: May 30, 1990

[51] Int. Cl.$^5$ ............................................. B29C 67/22
[52] U.S. Cl. .................................. 264/46.4; 264/275; 264/276; 264/277; 264/278
[58] Field of Search .................... 264/46.4, 46.5, 46.6, 264/46.7, 46.8, 275, 277, 278, 276

[56] References Cited

U.S. PATENT DOCUMENTS

| | | | |
|---|---|---|---|
| 3,336,705 | 8/1967 | Vecchiarelli et al. | 52/222 |
| 4,323,406 | 4/1982 | Morello | 264/46.4 |
| 4,758,294 | 7/1988 | Storch | 264/46.6 |
| 4,779,390 | 10/1988 | Repper et al. | 52/222 |
| 4,833,741 | 5/1989 | Mizund et al. | 264/46.4 |
| 4,956,136 | 9/1990 | Mizuno et al. | 264/46.6 |
| 4,968,235 | 11/1990 | Nakane et al. | 264/46.4 |
| 5,007,815 | 4/1991 | Shoji | 264/46.6 |

FOREIGN PATENT DOCUMENTS

| | | | |
|---|---|---|---|
| 55-107436 | 8/1980 | Japan | 264/46.8 |
| 2193462 | 2/1988 | United Kingdom | 264/46.8 |

Primary Examiner—W. Gary Jones
Assistant Examiner—Allan R. Kuhns
Attorney, Agent, or Firm—Wood, Phillips, Van Santen, Hoffman & Ertel

[57] ABSTRACT

A method of integrating first and second skins into a contiguous cover layer by: providing a first skin with a first surface to be exposed and an opposite backing surface, with the first skin having an offset edge defining a first corner with the exposed part of the first surface; providing a second skin with a second surface to be exposed and an opposite backing surface, with the second skin having an offset edge defining a second corner with the exposed part of the second surface; placing a mold element/partition between the first and second offset skin edges to maintain a space between at least a part of the first and second offset skin edges; pouring a flowable foundation material that will harden against the backing surfaces of the first and second skins so that the hardened foundation material exerts a force tending to urge the first and second corners towards each other; and removing the mold element/partition from between the first and second offset skin edges so that the space between the parts of the first and second offset skin edges diminishes to cause the first and second corners to move closer to each other than they are with the mold element in place.

17 Claims, 5 Drawing Sheets

METHOD OF MANUFACTURING FOAM-MOLDED PRODUCTS

BACKGROUND OF THE INVENTION

1. Field of the Invention

This invention relates to a method of integrating two different skins/webs into a contiguous decorative cover layer and, more particularly, to a method of molding marginal edges of the skins/webs into a lightweight foundation material to produce a tight, aesthetically pleasing seam at the juncture of the skins/webs. The invention also comprehends a panel product produced by the aforesaid method, which panel includes the foundation material and the skins fused therewith.

2. Background Art

One problem that has been particularly vexatious in the automobile interior trim art is that of integrating two skins/webs of dissimilar material into a contiguous layer to cover a fixed contour frame, as to produce an interior door panel. While description herein of the prior art and the inventive structure is focused primarily on automobile interiors, it should be understood that this same technology is common to the furniture and building industries, as well as others.

It is common on automobile door panels to use different skin/web materials. For example, a door panel may have a synthetic resin cover sheet over part of the exposed surface thereof and one or more ornamental fabric or board inserts, as around door handles, or the like.

A number of problems are contended with in integrating two dissimilar skins/webs into a panel. First of all, there is a tendency of the skins/webs to peel off of the underlying foundation surface to which they are attached, as by an adhesive. Another problem is that of maintaining the seam at the juncture of the two dissimilar webs tight, which is desirable for aesthetic reasons. Rarely do conventional techniques produce a seam of high enough quality that an overlying, decorative molding is not required.

One example of a prior art method for integrating dissimilar skins/webs onto a panel is disclosed in U.S. Pat. 4,779,390, to Repper. Repper preforms a groove in his foundation element and tucks the marginal, offset edges of the skins/webs into the groove. An adhesive is used to bond the backing surfaces of the skins to the foundation element.

The Repper manufacturing method, and product produced thereby, have numerous drawbacks. First of all, there is a tendency of the edges of the webs that are tucked into the grooves to escape from the grooves. If this occurs, the structure becomes unsightly. In the absence of an overlying molding, progressive separation of the webs from the foundation element inevitably results.

Another problem with the Repper technique is that it is inherently difficult with that technique to produce a tight seam. The skins/webs must be precisely cut and aligned to make certain that the offset marginal edges of the webs extend deeply into the preformed groove, but not entirely to the bottom thereof which would cause bulging and bunching up of the skin/web material.

The ineffectiveness of Repper in positively joining the skins/webs at the seam between adjacent webs is demonstrated by Repper's recommended use of a molding strip, which is shown in FIG. 9, to maintain the marginal edges in their receptive grooves. The need for the molding strip adds to the expense of manufacturing the door panel by requiring additional parts and assembly steps and assembly time.

A further drawback with the Repper structure is that it requires a very sturdy foundation element which will positively hold its shape. Repper suggests metal as one suitable material, which is undesirable from a weight standpoint particularly on automobiles. Today's automobile manufacturers place considerable emphasis on weight reduction, primarily for fuel economy.

A still further drawback with the Repper technique is that it is inherently difficult with that technique to prevent the development of bubbles and/or wrinkles in the web/skin.

Another known prior art method of producing a decorative panel with different skin/web materials is described below in the Detailed Description of the Drawings, relative to one of the Figures in this case. Briefly, that prior art method employs independently formed subassemblies, each with a different web/skin, which completed subassemblies are then joined to each other, as through the use of brackets or anchors.

This manufacturing method is deficient in that it requires three separate processes - two assembly routines for the subassemblies and then the connection thereof. The manufacturing process becomes quite complicated and inefficient with a resulting increase in manufacturing costs.

A further problem is that once the subassemblies are brought together, the skins/webs thereon tend to compress and wrinkle.

SUMMARY OF THE INVENTION

The present invention is specifically directed to overcoming the above enumerated problems in a novel and simple manner.

The present invention comprehends a method of integrating first and second skins into a contiguous cover layer by: providing a first skin with a first surface to be exposed and an opposite backing surface, with the first skin having an offset edge defining a first corner with the exposed part of the first surface; providing a second skin with a second surface to be exposed and an opposite backing surface, with the second skin having an offset edge defining a second corner with the exposed part of the second surface; placing a mold element/partition between the first and second offset skin edges to maintain a space between at least a part of the first and second offset skin edges; pouring a flowable foundation material that will harden against the backing surfaces of the first and second skins so that the hardened foundation material exerts a force tending to urge the first and second corners towards each other; and removing the mold element/partition from between the first and second offset skin edges so that the space between the parts of the first and second offset skin edges diminishes to cause the first and second corners to move closer to each other than they are with the mold element in place.

The inventive method contemplates very few assembly steps compared to known prior art methods. The skins can be simply placed strategically in a mold after which the foundation material is poured and cured and the mold therefor removed to complete manufacture. The mold partition(s) conveniently divides the mold into regions/zones for facilitated placement of the different skins.

With the inventive method, the seam between the first and second skins is extremely tight. This is due to the fact that the hardened foundation material, with the mold element in place, has residual forces therein which squeeze the offset edges against each other upon the mold element/partition being removed.

The invention also contemplates enhancing this force that tends to diminish the seam width. An elastic connecting jig, with first and second spaced jaws, is provided and biasably captures and urges at least part of the first and second offset skin edges towards each other and against the mold element/partition as the foundation material is poured. Once the mold element is removed, the residual force in the foundation material tending to close the seam is augmented by the closing force of the jaws on the jig.

To further enhance the seam closing forces developed by the foundation material and the jaws, a compressible material is disposed on the backing surface of at least one of the skins. During the molding process, the foundation material compacts the compressible material and, upon the mold element being removed, the compressible material reassumes its uncompressed state to contribute an additional force tending to diminish the seam width. By increasing the thickness of the compressible material, the seam closing force can be proportionately increased. The compressible material also gives a soft feel to the product.

With the inventive method, the resulting panel, including the combination of the foundation material and the skins, is light in weight. Preferably, the foundation material is a urethane foam, which is sufficiently rigid to maintain its shape. A reinforcing matt may be employed.

Another advantage afforded by the present invention is that folding, wrinkling and bubbling of the skins is minimized. This is due to the fact that the expanding foundation material squeezes the skins flushly against the mold surfaces which are complementary to the shape of the exposed surface of the completed product.

A further advantage with the present invention is that the urethane foam and skins are fused during the manufacturing process. This results in a positive connection between the skins and the foundation material over substantially the entire exposed extent of the skins.

To prevent migration of the flowable foundation material between the offset edges of the first and second skins, an optional barrier layer is provided. This layer may be a foam material or a thin tape. This confines the foundation material within a cavity defined by the mold to maximize the pressure buildup therein due to the expansion of the foam material and prevents the escape of the flowable material through the seam as would produce an unsightly structure. Maximizing pressure contributes to a tight, aesthetically pleasing seam.

The invention also contemplates overlapping of the skin/web edges in such a manner that the path for the foam between the edges is effectively blocked. This obviates the need for a barrier layer.

The present invention also contemplates a panel resulting from the inventive method, which panel consists of a foundation material having a first face on which the first and second skins are attached, and a groove in the foundation material in which the first and second offset edges extend, with the first and second offset edges being embedded in the foundation material.

With the offset edges embedded in the foundation material, they are prohibited from escaping. This maintains the consistent connection and alignment between the skins and the foundation material.

The connection of the offset edges and foundation material is further enhanced by having the offset edges doubled back on themselves and/or folded over an adjacent skin edge.

DETAILED DESCRIPTION OF THE DRAWINGS

Figure 1:
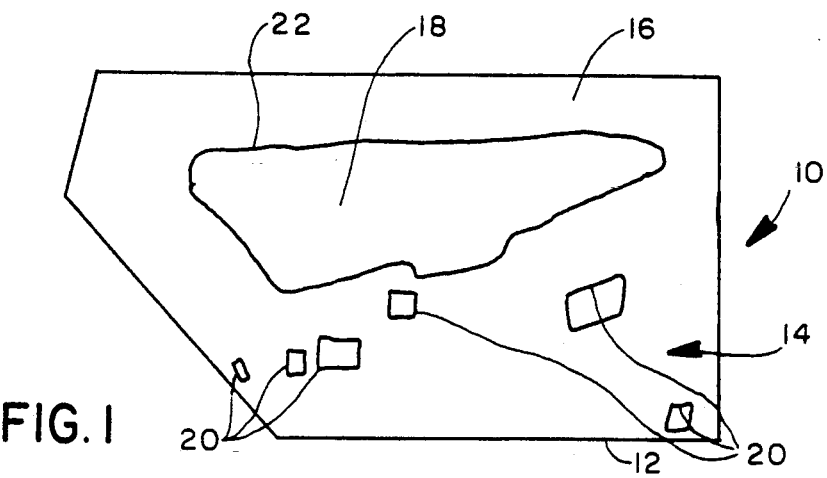
FIG. 1 is a front elevation view of an automobile door panel made according to the present invention and having first and second skins integrated into a cover layer therefor.

In FIG. 1, an interior automobile door panel is shown at 10, made in accordance with the present invention. The door panel 10 is only exemplary of a large number of different articles in many different industries that can be made by employing the inventive method. The door panel 10 is attached to and exposed on the inside surface of one of the automobile doors. The door panel 10 is generally trimmed to coordinate with the auto interior.

On the door panel 10 shown in FIG. 1, a foundation element 12 is provided and has an exposed cover layer 14 consisting of, for example, a poly vinyl chloride skin 16, which entirely surrounds a separate skin insert 18, which is, for example, a fabric. The skins 16, 18 can be combinations of cloths, wood pulp, etc. or just different colors of the same material. When cloths are used, it is desirable to use stretch fabric such as tricot or jersey. It is also possible to make the skins 16, 18 from synthetic resin, marble, or a board made of layers of such materials. If a board is used, it generally must be preformed as by press or injection molding. Several holes 20 are provided through the door panel 10 to accommodate various mechanisms and accessories associated with the automobile, i.e. clips, latches, lights, handles, etc.

The present invention is specifically directed to affording a door panel 10 that is light in weight, yet sufficiently durable to withstand the wear encountered in the automobile environment. It is a further objective of the present invention to provide an aesthetically pleasing door panel 10, which is accomplished primarily by affording a wrinkle- bubble-free exposed surface and a very tight seam 22 at the juncture between the abutting skins 16, 18.

Before the inventive structure 10 and method of forming the same are described herein, a brief description of one prior art method used to integrate separate skins into a cover panel is in order. One such prior art panel is shown at 24 in FIG. 2. The panel 24 consists of a preassembled base subassembly 26 to which a preassembled insert subassembly 28 is attached. The base subassembly 26 has a first skin 30 which, in conjunction with a retention element 32, defines a cavity 34 containing a filler material 36. The insert subassembly 28 has a different skin 38, or different color skin, defining an enclosed cavity 40 containing a similar filler material 42. A retention element 44 is provided on one wall 46 of the subassembly 28 and is molded into the filler material 42. Once the subassemblies 26, 28, are preassembled, Z-shaped anchors 48, 50 are employed to maintain the subassemblies 26, 28 together in the assembled relationship shown in FIG. 2.

Figure 2:
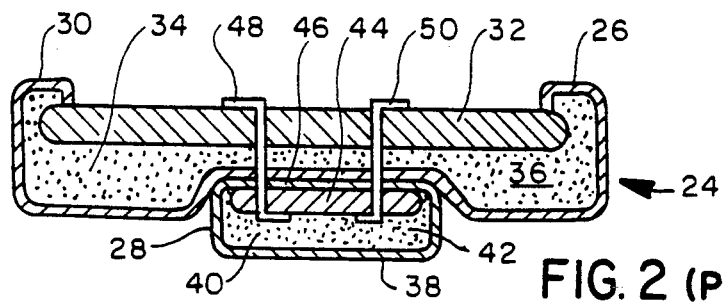
FIG. 2 is a cross-sectional view of a prior art panel with integrated first and second skins.

The manufacturing process for the structure 24 in FIG. 2 is quite complicated. Many different elements are required and three distinct assembly steps are required-formation of each of the two subassemblies 26, 28 and subsequent connection thereof. Due to the fact that the filler material 36, 42 is relatively soft, it is possible that the anchors 48, 50 may work loose over time which would allow undesired relative movement between the subassemblies 26, 28. Further, the anchors 48, 50 squeeze and deform the subassemblies 25, 28, which may wrinkle or bulge the skins 30, 38, giving the impression of an improper fit. Also, there may be a relatively large, unsightly gap at the interface of the skins 30, 38. This may be due in part to manufacturing inaccuracies which produce less than a perfect match between the subassemblies.

The present invention affords a simplified manufacturing process over that used to construct the panel 24 in FIG. 2, and results in a higher integrity product that can be made more aesthetically pleasing than the panel 24 in FIG. 2.

The basic steps used to form a panel, such as that 10 in FIG. 1, are shown consecutively in FIGS. 3(a)-3(e). FIGS. 4-7 also sequentially show certain of these steps at the juncture of the skins 16, 18.

A two-part mold at 52 is employed and consists of a lower female half 54 and an upper male half 55. The lower mold half 54 has an upstanding peripheral wall 56 bounding a forming cavity 58. A continuous mold element/partition 60 extends upwardly from the bottom wall 62 of the lower mold half 54. This partition 60 determines the outline of the seam 22 between the skins 16, 18. The partition 60 separates the forming cavity 58 into a first zone 64, within which the fabric skin 18 is placed, and a second zone 66, completely surrounding the first zone 64 and defining a receptacle for the skin 16.

The first assembly step involves placing the skin 18 in the first zone 64. A surface 68 on the skin 18 to be exposed on the panel 10 is placed facially against the upwardly facing surface 70 on the bottom wall 62 of the lower mold half 54. The marginal edge 72 of the skin 18 is turned up against the peripheral wall surface 74 on the partition 60 bounding the first zone 64.

The skin 16 is then put in place in the zone 66. The skin 16 can be preformed by slush molding, vacuum molding, injection molding, or other known molding methods using PVC resin, ABS resin, other synthetic resin, or the like. Unmolded cloth, synthetic resin, or other material, with or without a backing, can also be used. The preforming of the skin 16 may be necessary depending on the particular end shape of the panel 10. The skin 16 also has an offset marginal edge 76 which is turned up and facially engages a peripheral wall surface 78 bounding the cavity 58. At the partition 60, the marginal edge 80 of the skin 16 is turned upwardly against the partition wall surface 82, extended over the upper edge 84 of the partition 60, over the free end 86 of the skin 18 and back against the offset edge 72 of the skin 18 at 87. The skin 16 has a surface 88 exposed on the panel 10 which facially abuts an upwardly facing surface 90 on the lower mold half 54 in the first zone 66, which surface 90 is complementary to the final panel shape.

Figure 3A:
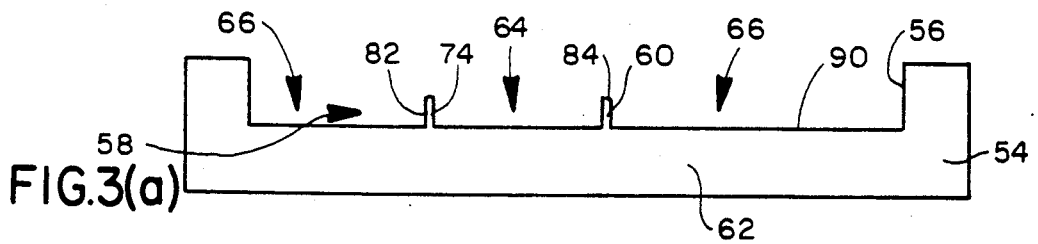
FIGS. 3a through 3e show sequentially the steps for molding the panel in FIG. 1 according to the present invention.
Figure 3B:
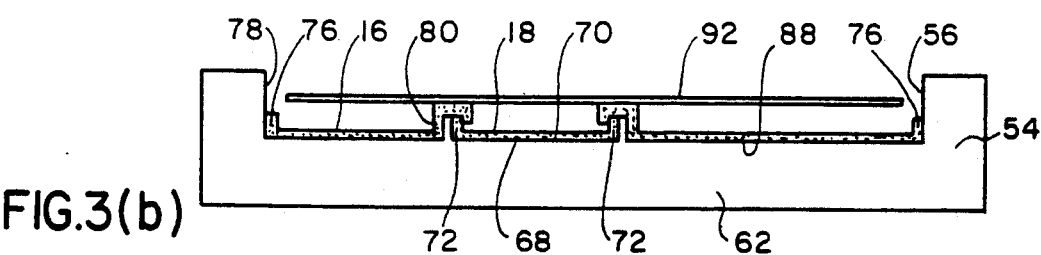
Figure 3C:
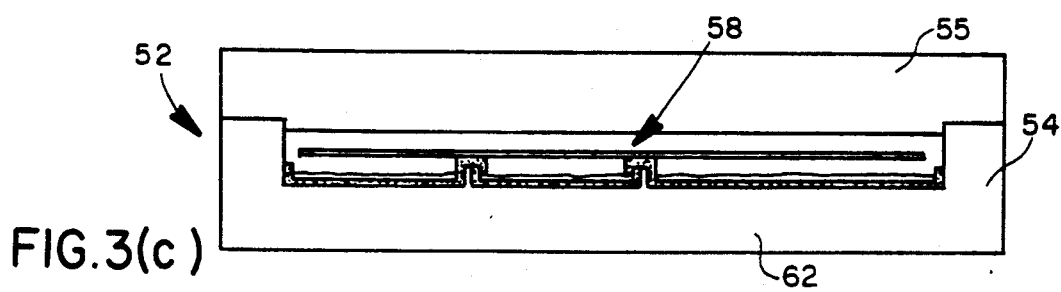
Figure 3D:
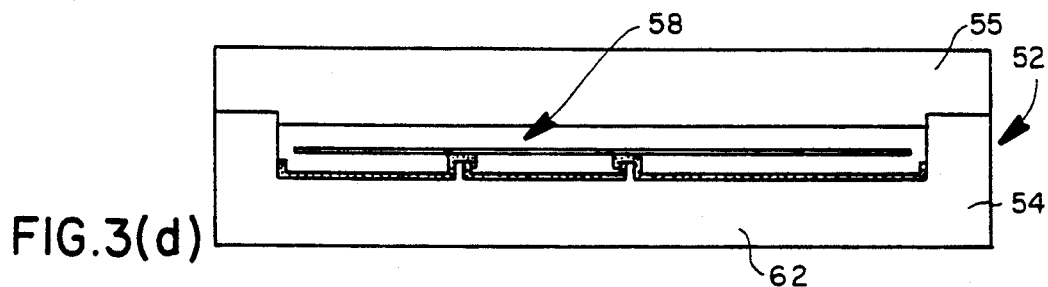
Figure 3E:
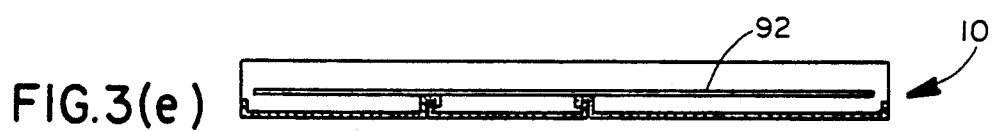
Figure 4:
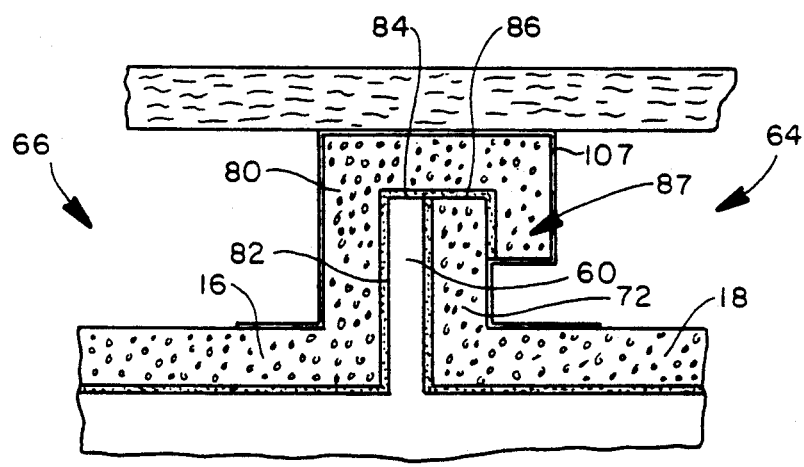
FIG. 4 is an enlarged cross-sectional view of the connection between adjacent skin edges in FIG. 3b.
Figure 5:
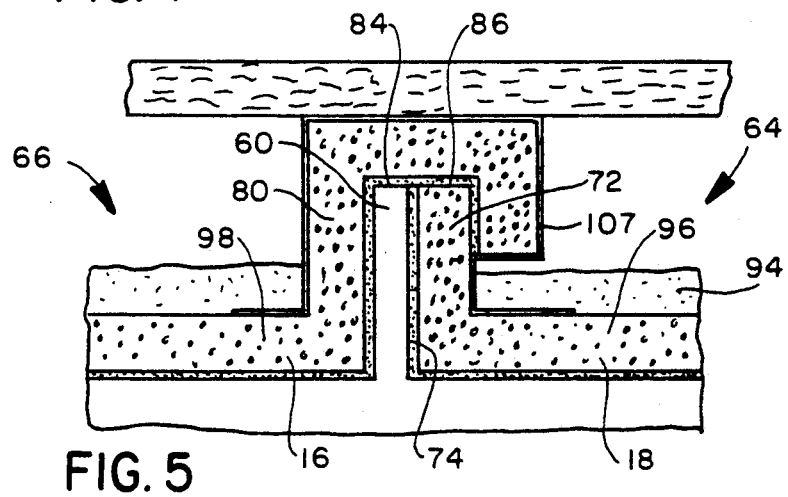
FIG. 5 is an enlarged cross-sectional view of the connection between adjacent skin edges in FIG. 3c.
Figure 6:
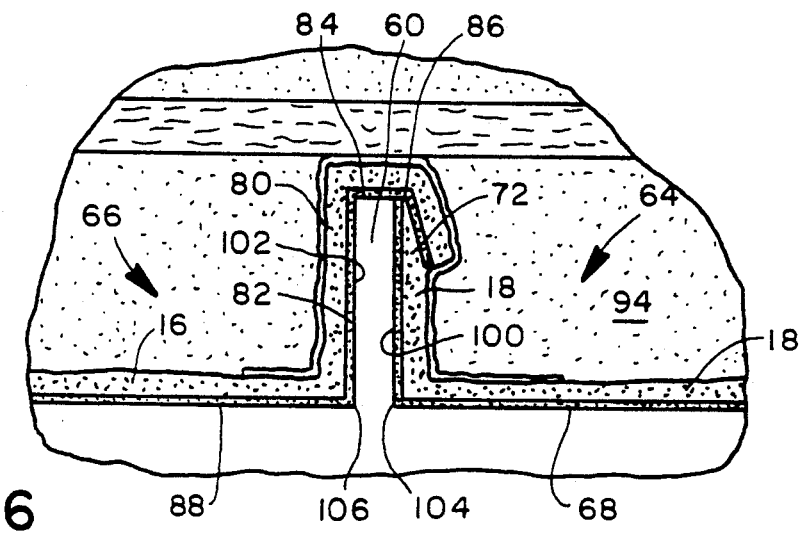
FIG. 6 is an enlarged cross-sectional view of the connection between adjacent skin edges in FIG. 3d.

After the skins 16, 18 are placed in the mold 52, a reinforcing matt 92 is laid across the partition 60. The matt 92 is made preferably from glass fibers and has an overall thickness of about 5 mm. A predetermined amount of urethane foam is then poured into the forming cavity 58 after which the male, upper mold half 55 is nested in the lower mold half 54, as shown in FIG. 3b. As the foam 94 expands in the cavity 58, it progressively collapses compressible foam backing layers 96, 98 on the skins 18, 16, respectively. The foam 94 can be poured with the mold halves 54, 55 closed or the halves 54, 55 can be closed after pouring. The backing layer 98 is preferably PVC or PE resin. The backing layer 96 on the skin 18 is preferably polyurethane, PP resin or PE resin. The backing layers 96, 98 are laminated onto the skins 16, 18. With the foam 94 completely expanded and hardened, the backing layers 96, 98 are compressed substantially to the state shown in FIG. 6.

A hard urethane foam 94 is preferred and a preferred composition for the foam is as follows:

TABLE I

| | |
|---|---|
| SC1001 (Asahi denka) | 100 |
| SH193 (Toray Silicone) | 1 |
| DABCO35LY (Mitsui Product) | 2.5 |
| Water | 1.5 |
| CR-100 (Mitsui Nisso Urethane) | 147.8 |

Semi-rigid urethane foam can also be used effectively.

Figure 7:
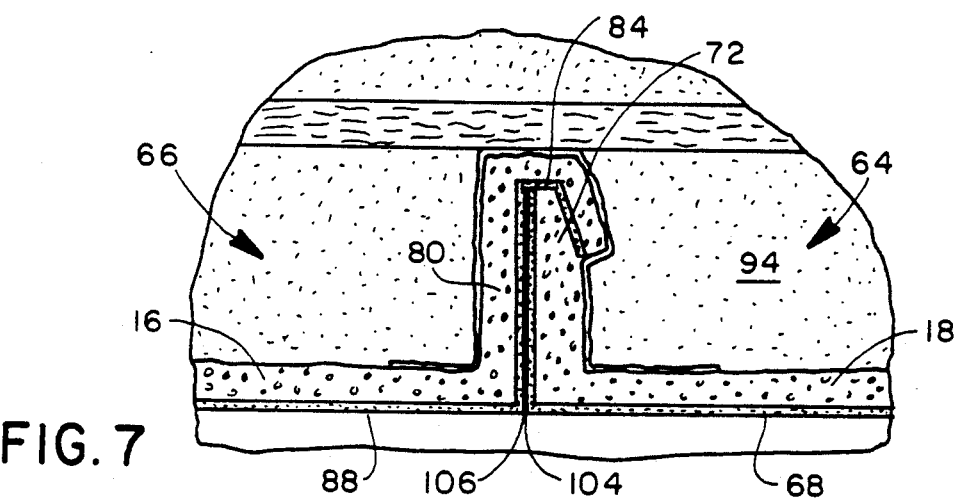
FIG. 7 is an enlarged cross-sectional view of the connection between adjacent skin edges in FIG. 3e.

Upon the mold halves 54, 55 being separated and the partitions 60 moving out from between the offset edges 72, 80 on the skins 16, 18, the foam backing layers 96, 98 are allowed to expand toward an uncompressed state, thereby driving the facing surfaces 100, 102 (FIG. 6) on the offset edges 72, 80, respectively, against each other and, in so doing, bringing the corner 104, between the surface 100 and the exposed part of surface 68, and the corner 106, between the surface 102 and the exposed part of surface 88, closely adjacent to each other, as shown clearly in FIG. 7. This creates a tight seam 22 and also causes the skins 16, 18 to be positively held and embedded in the foam 94. By increasing the thickness of the backing layers 96, 98, the closing force on the seam 22 can be proportionately increased. The backing layers 96, 98 also give a soft feel to the cover layer 14.

To prevent migration of the foam 94 between the skins 16, 18 during manufacture, an optional tape layer 107 can be provided around the cooperating edges 72, 80 of the skins 18, 16, respectively. This also maximizes the pressure within the cavity 58 to more completely compress the foam backing layers 96, 98 to produce a tighter seam 22 upon the mold 52 being removed. The tape 107 is preferably a urethane material with a thickness on the order of 25 μmm. Other thicker foam tapes can be used. The thicker foam tape serves as a filler in addition to acting as a barrier to the flow of foam 94.

Figure 8:
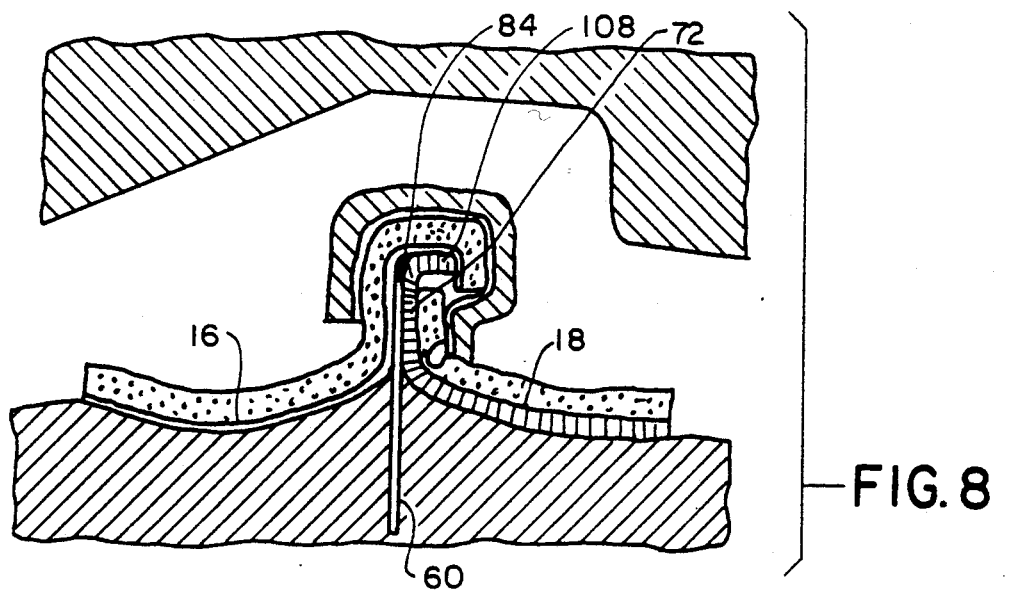
FIG. 8 is a cross-sectional view showing a modified connection between edges of adjacent skins according to the present invention.
Figure 9:
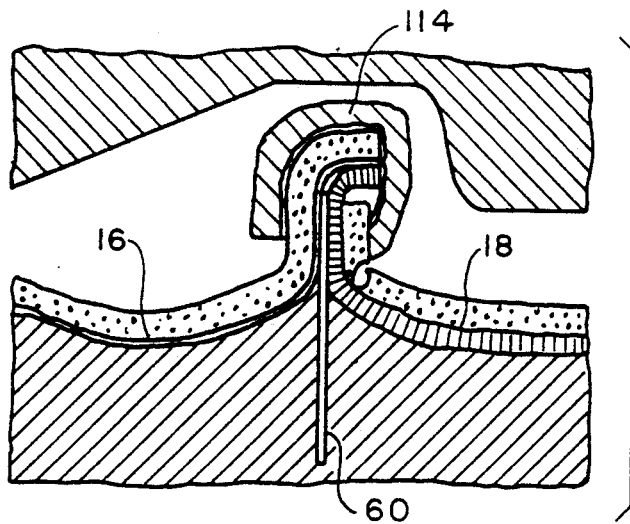
FIG. 9 is a a cross-sectional view of a still further modified connection between edges of adjacent skins according to the present invention.
Figure 10:
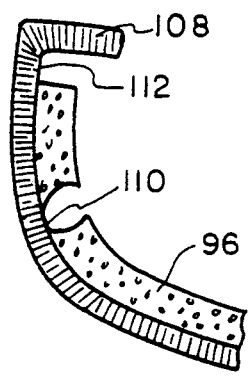
FIG. 10 is an enlarged, isolated view of one of the skin layers on the panel of FIG. 9 with foam backing thereon and showing voids therein to facilitate bending.

A modified connection between the skin edges 72, 80, according to the present invention, is shown in FIGS. 8-10. There are two principal distinctions between the structure in FIGS. 8-10 and that in the prior embodiment. First, the offset edge 72 of the skin 18 extends upwardly beyond the upper edge 84 of the partition 60 and is doubled back to define an extension 108. This causes more of the skin 18 to be exposed to the foam 94 and results in a more positive gripping of the skin 18 by the foam 94.

The other difference in of the structure in FIGS. 8-10 is that the foam backing layer 96 is provided with voids 110, 112 to facilitate bending of the skin 18 into the configuration in FIGS. 8-10. In the absence of the void 112, the edge 108 would tend to spring back to run parallel with the height of the partition 60.

One further modification to the structure in FIGS. 8-10 is the provision of a thick foam barrier layer 114 as a substitute for the tape layer 106 in the prior embodiment.

Figure 11:
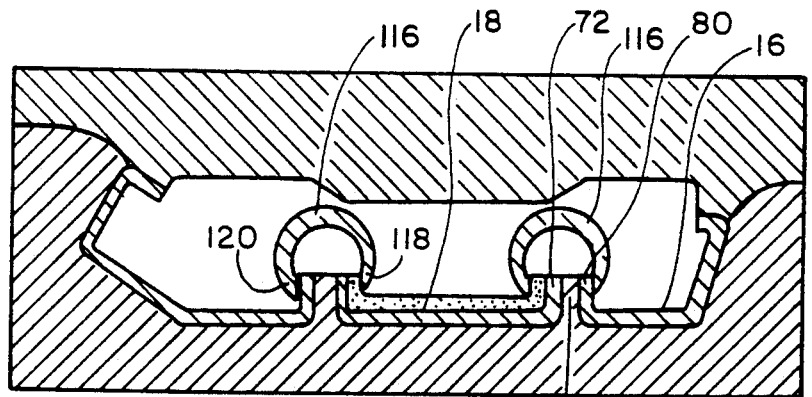
FIG. 11 is a cross-sectional view of a mold set-up with a connecting jig for facilitating panel formation according to the present invention.
Figure 12:
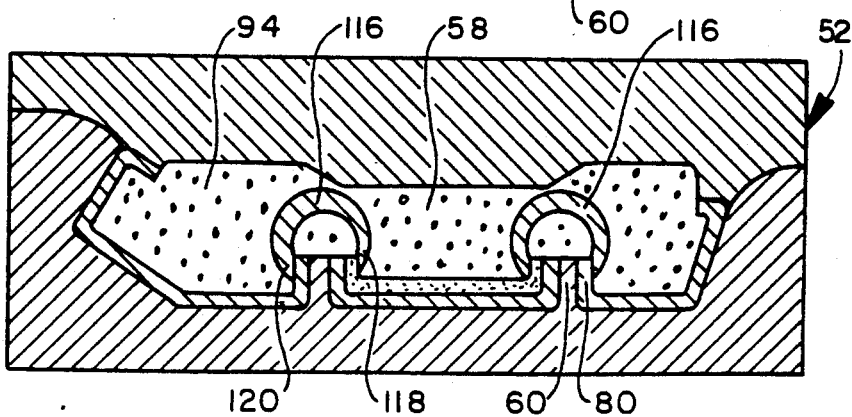
FIG. 12 is a view as in FIG. 11 with foam material poured into the mold.
Figure 13:
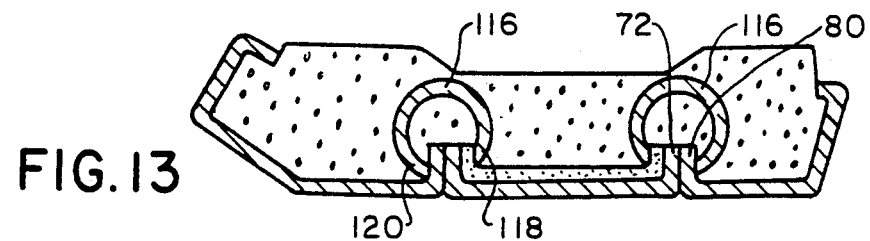
FIG. 13 is a view as in FIG. 12 with the completed product separated from the mold.

Another aspect of the invention is the provision of an attachment jig to hold the skins 16, 18 biasably against the mold partition 60, as shown in FIGS. 11-17. In FIGS. 11-13, a first configuration for the connecting jig is shown at 116. Connecting jig 116 can extend either partly or completely around the overlap between the skins 16, 18 at the partition 60. The connecting jig 116 consists of a flexible tubular element that is slit lengthwise thereof to define first and second spaced jaws 118, 120. Preferably, the connecting jig 116 is formed from an elastic resin such as PVC resin, rubber, or polyurethane, but it could likewise be formed of spring-type metal. The jaws 118, 120 of the connecting jig 116 are spread to accept and captively embrace the offset 72 on the skin 18, the partition 60 and offset 80 on the skin 16. It can be seen that the skin 16 does not have or need a foam backing layer, though one could be provided. With the connecting jig 116 in place, the mold cavity 58 is filled with urethane foam, as shown in FIG. 12.

Upon the mold 52 being separated, the offset edges 72, 80 on the skins 18, 16 respectively, are squeezed towards each other by the restoring force in the connecting jig 116. Connecting jig 116 serves the dual purpose of (a) holding the skins 16, 18 firmly against the partition 60 to prevent migration of foam 94 between the skins 16, 18 and partition 60 and (b) biasing the offset edges 72, 80 on the skins 18, 16 towards each other upon the mold 52 being separated.

Figure 14:
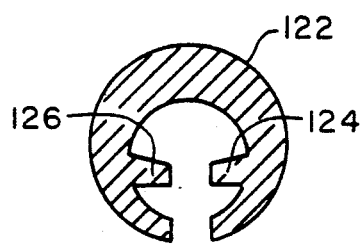
FIG. 14 is a cross-sectional view of a modified form of connecting jig as used with the structure in FIGS. 11–13.

Various other configurations for the connecting jig are shown in FIGS. 14-17. The connecting jig 122 in FIG. 14 is similar to the jig 116, however has inwardly projecting ribs 124, 126 to enhance its gripping force.

Figure 15:
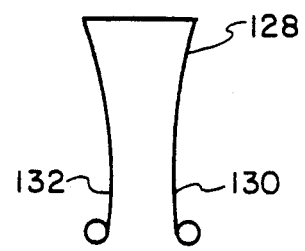
FIG. 15 is a cross-sectional view of another modified form of connecting jig according to the present invention.

In FIG. 15, a jig 128 is shown made preferably from spring-type metal in an inverted U-shape with biasing legs 130, 132.

Figure 16:
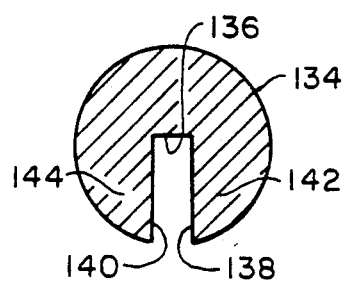
FIG. 16 is a cross-sectional view of a still further modified form of connecting jig according to the present invention.

In FIG. 16, a jig 134 is shown with a downwardly opening U-shaped recess 136 bounded by jaw surfaces 138, 140. The jig 134 operates similarly to the jigs 116, 122, however, the jaws 142, 144, defining the jaw surfaces 138, 140 are substantially more rigid.

Figure 17:
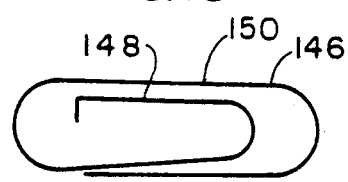
FIG. 17 is a side elevation view of a still further modified form of connecting jig according to the present invention.

FIG. 17 shows a connecting jig 146 defined preferably by a formed piece of wire. The wire is bent in the configuration of a conventional type paper clip with spreadable U-shaped legs 148, 150 to capture the skins 16, 18 and partition 60.

Figure 18:
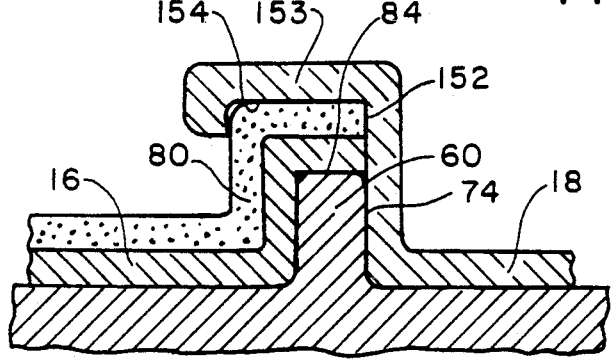
FIG. 18 is a cross-sectional view of a modified form of connection between adjacent skin edges according to the present invention.
Figure 19:
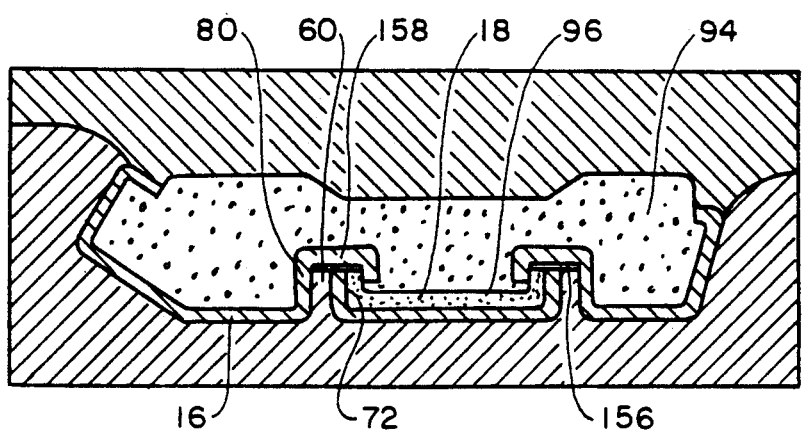
FIG. 19 is a cross-sectional view of a mold with a panel showing a still further modified form of connection between edges of joined skins.

Two other modifications contemplated by the invention are shown in FIGS. 18 and 19. In FIG. 18, the skin 16 is extended over the upper edge 84 of the partition 60 so that the free end 152 of the skin 16 is flush with the partition surface 74. The skin 18 is wrapped against the partition surface 74, with an extension 153 directed around the edge 152 and over the part of the skin 16 overlying the upper partition edge 84 and is doubled back downwardly so as to define a groove 154 to accept the projection 60 and skin edge 80. Upon the mold 52 being removed, extension 153 bends down to close the seam 22. This arrangement affords a leakproof seal around the partition 60 to prevent migration of foam 94 between the skins 16, 18 and thereby eliminates the need for a barrier layer, such as the tape 107 in FIG. 6. The extension 153 and groove 154 therein may be premolded.

In FIG. 19, an arrangement is shown similar to that in FIGS. 4-7, with the exception that the foam backing material 96 on the skin 16 in the prior embodiment is eliminated. Further, a groove 156 is preformed into an extension 158 on the skin 16 to define a receptacle for the combined thickness of the projection 60 and offset edge 72 on the web 18. The foam 94 squeezes the projection 60 and edge 72 into the matched groove 156 to make a leakproof connection, obviating the need for a connecting jig and barrier layer. Connecting jigs could, however, be used if desired. Upon the mold 52 being removed, the extension 158 bends down to collapse the skin edges 72, 80 against each other. The compressible layer 96 also reassumes its undeformed state to diminish the width of the seam 22.

The foregoing disclosure of specific embodiments is intended to be illustrative of the broad concepts comprehended by the invention.

We claim:

1. A method of integrating first and second skins into a contiguous cover layer, said method comprising the steps of:

providing a first skin with a first surface to be exposed and an opposite, backing surface, said first skin having an offset edge defining a first corner with an exposed part of said first surface;

providing a second skin with a second surface to be exposed and an opposite, backing surface, said second skin having an offset edge defining a second corner with an exposed part of said second surface;

placing a compressible material on the backing surface of at least one of said first and second skins;

placing a mold element/partition between said first and second offset skin edges to maintain a space between at least a part of said first and second offset skin edges;

pouring a flowable foundation material that expands and hardens against the compressible material on the backing surfaces of the at least one of the first and second skins so that the expanding and hardening foundation material compresses the compressible material and exerts a force tending to urge the first and second corners toward each other; and removing the mold element from between said first and second offset skin edges so that the space between the parts of said first and second offset skin edges diminishes to cause the first and second corners to move closer to each other than they are with the mold element/partition in place, wherein said compressible material is less rigid than said expanded and hardened foundation material and said compressible material, upon said mold element being removed, expands to further urge the first and second corners toward each other.

2. The method of integrating first and second skins into a contiguous cover layer according to claim 1 including the step of urging the first and second offset skin edges towards each other and against the mold element/partition as the flowable foundation material is poured against the backing surfaces.

3. The method of integrating first and second skins into a contiguous cover layer according to claim 2 wherein a connecting jig is provided having first and second spaced jaws and including the step of assembling the jig so that the first and second jaws capture at least a part of said first and second skins so that at least parts of said first and second offset skin edges are biasably urged by the jaws towards each other as the foundation material is poured.

4. The method of integrating first and second skins into a contiguous cover layer according to claim 3 wherein the connecting jig is assembled so that parts of the first and second skins and at least a part of the mold element/partition are biasably captured between the first and second jaws.

5. The method of integrating first and second skins into a contiguous cover layer according to claim 4 wherein said connecting jig has a C-shaped cross section with the free ends of the C defining said first and second jaws.

6. The method of integrating first and second skins into a contiguous cover layer according to claim 1 wherein said foundation material is urethane foam.

7. The method of integrating first and second skins into a contiguous cover layer according to claim 1 including a mold having first and second joinable parts defining a cavity into which said flowable material is poured and confined and said mold element is on one of said first and second joinable mold parts.

8. The method of integrating first and second skins into a contiguous cover layer according to claim 7 wherein at least one of the joinable mold parts has a surface complementary to a desired configuration of the surface to be exposed on one of the first and second skins and the surface to be exposed on the one of the first and second skins is forcibly pressed against the complementary mold surface by the foundation material.

9. A method of integrating first and second skins into a contiguous layer, said method comprising the steps of:

providing a first skin with a first surface to be exposed and an opposite, backing surface, said first skin having an offset edge defining a first corner with an exposed part of said first surface;

providing a second skin with a second surface to be exposed and an opposite, backing surface, said second skin having an offset edge defining a second corner with an exposed part of said second surface;

placing a compressible material on the backing surface of at least one of the first and second skins, there being a mold cavity adjacent to the backing surfaces of the skins;

placing a mold element/partition between said first and second offset skin edges to maintain a space between at least a part of said first and second offset skin edges, said offset edge of said first skin being in overlapping relationship with said second skin such that said exposed surface of said first skin contacts said backing surface of said second skin;

pouring a flowable foundation material into the mold cavity against the compressible material so that the compressible material is compressed as the flowable foundation material expands and hardens; and removing the mold element/partition from between said first and second offset skin edges so that the space between the parts of said first and second offset skin edges diminishes to cause the first and second corners to move closer to each other than they are with the mold element/partition in place, wherein said compressible material is less rigid than said expanded and hardened flowable foundation material and said compressible material, upon said mold element being removed, expands to urge the first and second corners toward each other.

10. The method of integrating first and second skins into a contiguous layer according to claim 9 including the step of placing a barrier layer around the offset edges of the first and second skins to prevent migration of the foundation material between said offset edges.

11. The method of integrating first and second skins into a contiguous layer according to claim 9 wherein the flowable foundation material is hard urethane foam.

12. The method of integrating first and second skins into a contiguous layer according to claim 9 wherein the first surface of the first skin is fabric.

13. The method of integrating first and second skins into a contiguous layer according to claim 9 wherein the second surface of the second skin is poly vinyl chloride.

14. The method of integrating first and second skins into a contiguous layer according to claim 9 wherein the offset edges of the first and second skins are placed in intimate engagement before the flowable foundation material is poured.

15. The method of integrating first and second skins into a contiguous layer according to claim 9 wherein the compressible material has at least one void to facilitate bending of the one of the first and second skins.

16. A method of integrating first and second skins into a contiguous layer, said method comprising the steps of:

providing a first skin with a first surface to be exposed and an opposite, backing surface, said first skin having an offset edge defining a first corner with an exposed part of said first surface;

providing a second skin with a second surface to be exposed and an opposite, backing surface, said second skin having an offset edge defining a second corner with an exposed part of said second surface;

placing a compressible material on the backing surface of at least one of said first and second skins;

placing said first and second skins in a cavity in a mold with the offset edges in adjacent relationship;

exerting a force on the offset skin edges to maintain the first and second corners in spaced relationship;

pouring a flowable foundation material into the cavity;

expanding and hardening the foundation material in said cavity to cause a pressure to be exerted on the first and second skins that urges the first and second corners toward each other and compresses the compressible material;

separating the expanded and hardened foundation material and first and second skins from the mold and releasing the maintaining force on the offset skin edges to allow the expanded and hardened foundation material to urge the first and second corners towards each other, wherein said compressible material is less rigid than said expanded and hardened foundation material and said compressible material, upon said mold element being removed, expands to further urge the first and second corners toward each other.

17. The method of integrating first and second skins into a contiguous layer according to claim 16 including the step of providing a reinforcing layer in said foundation material.

* * * * *